July 19, 1966  F. KNÖRR ETAL  3,261,767
EXTRACTIVE DISTILLATION FOR THE SEPARATION OF MIXTURES
CONTAINING UNSATURATED CARBOXYLIC ACID ESTERS
AND ALCOHOLS CAPABLE OF FORMING
AZEOTROPIC MIXTURES
Filed May 1, 1961
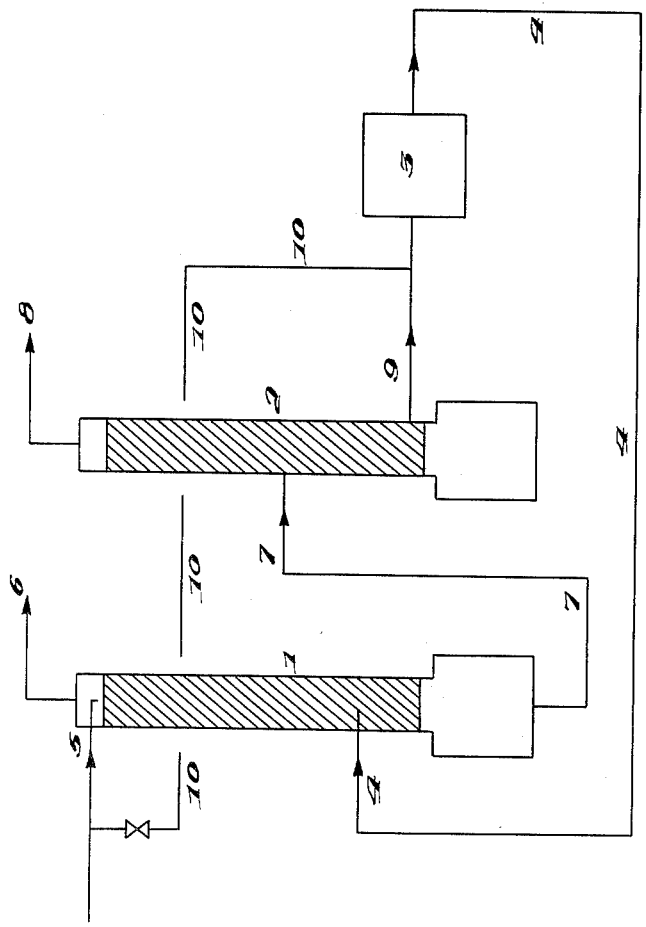
INVENTORS
FRITZ KNÖRR,
HELLMUTH SPES,
BY Bailey, Stephens + Huettig
ATTORNEYS

United States Patent Office 3,261,767
Patented July 19, 1966

3,261,767
EXTRACTIVE DISTILLATION FOR THE SEPARATION OF MIXTURES CONTAINING UNSATURATED CARBOXYLIC ACID ESTERS AND ALCOHOLS CAPABLE OF FORMING AZEOTROPIC MIXTURES
Fritz Knörr and Hellmuth Spes, Burghausen, Upper Bavaria, Germany, assignors to Wacker-Chemie G.m.b.H., Munich, Germany
Filed May 1, 1961, Ser. No. 106,662
Claims priority, application Germany, Apr. 29, 1960, W 27,753
4 Claims. (Cl. 203—60)

The present invention relates to an improved process for the separation of mixtures of alcohols and unsaturated carboxylic acid esters which are capable of forming azeotropic mixtures with each other and more particularly to an improved extractive distillation method for separating such mixtures of alcohols and unsaturated carboxylic acid esters.

The separation of mixtures containing esters and alcohols often provides great difficulties as many ester alcohol pairs form azeotropic mixtures with each other or the boiling points of both components are so close that a distillative separation is not possible.

Various proposals of processes have been made for the separation of alcohols and esters. One old process consists in removing the alcohol from the ester by washing it out, for example, with water. However, in such a procedure a portion of the ester is lost by dissolution in the extracting medium and the alcohol is obtained in great dilution.

Other proposals depend upon the extractive distillation of the ester-alcohol mixtures upon addition of a foreign liquid, such as dicarboxylic acid esters, hydrocarbons, ketones or keto esters. The disadvantage of such process is that an extraneous liquid is required which can lead to further intermediate fractions.

When the ester-alcohol mixture contains other components, as often is the case with cleavage reactions in which the higher boiling starting material is still present in the cleavage product, it hardly is possible to effect a simple distillation separation in view of the close proximity of the boiling points of the esters to be separated, the higher boiling starting material and the foreign liquid if such separation is not even impossible because of the formation of azeotropic mixtures of the higher boiling starting material with the foreign liquid. In such an instance it is necessary to separate off the azeotropic ester alcohol mixture from the higher boiling starting material in a first distillation, then separating such ester alcohol mixture into alcohol and an ester-foreign liquid mixture by extractive distillation and separating the latter by a third distillation. Such a process, however, is rather uneconomical.

The same disadvantage of the necessity of processing large quantities of liquid also occurs when removal of the alcohol is attempted by azeotropic distillation with lower hydrocarbons as several parts of hydrocarbon are required for each part of alcohol removed.

According to the invention it was unexpectedly found that mixtures containing esters of unsaturated carboxylic acids and alcohols, the ester and alcohol content of which can form azeotropic mixtures with each other and which may contain one or more components in excess, can be separated in a simple manner by extractive distillation with the aid of β-alkoxy carboxylic esters to distill off the alcohol and then separating the ester from the distillation residue by distillation from the β-alkoxy carboxylic acid ester. This separation is possible as β-alkoxy carboxylic acid esters do not form azeotropic mixtures with unsaturated carboxylic acid esters.

The process according to the invention is particularly advantageous for separating mixtures which in addition to the ester and the alcohol also contain a β-alkoxy carboxylic acid ester such as is, for example, obtained in the production of acrylic acid esters from β-alkoxy carboxylic acid esters. In such production of acrylic acid esters a cleavage product is obtained which in addition to the acrylic acid ester and the alcohol derived from the alkoxy group still contains substantial quantities of unconverted β-alkoxy carboxylic acid ester. It is possible to separate all three components easily without increasing the number of components by extractive distillation using the same β-alkoxy carboxylic acid as is contained in the cleavage product mixture.

In the simplest case the process according to the invention is carried out by introducing the mixture to be separated into the lower part of a column and the β-alkoxy carboxylic acid ester at the head of such column. Essentially ester free alcohol is withdrawn at the head of the column when proper reflux conditions are maintained whereas the β-alkoxy carboxylic acid ester-ester mixture running off from the sump of the column can be separated by simple distillation, for example, continuously carried out in a second column.

An especially advantageous continuous embodiment of the process according to the invention is obtained by combining the ester-alcohol separation with the cleavage of β-alkoxy carboxylic acid esters to acrylic acid esters and alcohols which can in this way be processed directly to pure acrylic acid esters without requiring azeotropic distillation or addition of extraneous extractive agents or solvents.

The accompanying drawing diagrammatically shows an apparatus suitable for carrying out such a combined process.

In carrying out the process in such apparatus the cleavage product which essentially consists of acrylic acid ester, alcohol and β-alkoxy carboxylic acid ester is supplied from the cleavage apparatus 3 to the column 1 over conduit 4. Fresh β-alkoxy carboxylic acid ester is supplied to the head of column 1 over conduit 5 and the alcohol is withdrawn over conduit 6. The acrylic acid ester-β-alkoxy carboxylic acid ester mixture withdrawn from the sump of column 1 is supplied through conduit 7 to column 2 in which it is separated into acrylic acid ester which is withdrawn from the head of column 2 through conduit 8 and β-alkoxy carboxylic acid ester which is supplied to cleavage apparatus 3 from the bottom of column 2 through conduit 9. Conduit 10 serves to provide the proper supply ratio of β-alkoxy carboxylic acid ester and cleavage product.

The following examples will serve to illustrate several embodiments of the process according to the invention.

*Example 1*

200 g. per hour of an azeotropic mixture of 46% of acrylic acid methyl ester and 54% of methanol stabilized with 0.1% hydroquinone were supplied to the lower portion of a column while 600 g. per hour of β-methoxy propionic acid methyl ester whose temperature was maintained at about 70° C. were introduced into the head of the column. The sump of the column was so heated that a weak reflux was maintained. The distillate and sump effluent were continuously withdrawn. 106–108 g. of distillate consisting of practically pure methanol and 688–692 g. of sump effluent were obtained per hour. Acrylic acid methyl ester was recovered from the latter by distillation under reduced pressure. The yields were almost quantitative.

*Example 2*

200 g. per hour of a mixture consisting of 65% of acrylic acid methyl ester, 25% of methanol and 10% of β-methoxy propionic acid methyl ester as obtained in the cleavage of β-methoxy propionic acid methyl ester were supplied to the lower portion of a column while 680 g. per hour of β-methoxy propionic acid methyl ester which were maintained at about 70° C. were introduced into the head of the column. The sump of the column was so heated that a weak reflux was maintained.

The distillate and the sump effluent were continuously withdrawn. 48–52 g. of distillate consisting of practically pure methanol and 827–830 g. of sump effluent were obtained per hour. Acrylic acid methyl ester was recovered from the latter by distillation under reduced pressure. The yields were almost quantitative. The β-methoxy propionic acid methyl ester which was separated from the acrylic acid methyl ester was in part recycled to the head of the column and in part subjected to cleavage to produce acrylic acid methyl ester and methanol. The resulting cleavage product was also supplied to the lower portion of the column.

*Example 3*

200 g. per hour of an azeotropic mixture consisting of 27.8% of acrylic acid ethyl ester and 72.2% of ethanol stabilized with 0.1% of hydroquinone were supplied to the lower portion of a column while 550 g. of β-ethoxy propionic acid ethyl ester which were maintained at about 80° C. were introduced into the head of the column. The sump of the column was so heated that a weak reflux was maintained. The distillate and the sump effluent were continuously withdrawn. 144 g. of distillate consisting of practically pure ethanol and 603–606 g. of sump effluent were obtained per hour. Pure acrylic acid ethyl ester was recovered from the latter by distillation under reduced pressure. The yields were almost quantitative.

*Example 4*

150 g. per hour of a mixture consisting of 60% of acrylic acid butyl ester, 28% propanol and 12% of β-propoxy propionic acid butyl ester were introduced into the lower portion of a column maintained at a reduced pressure of 50 mm. Hg while 450 g. per hour of β-propoxy propionic acid butyl ester containing 0.1% of hydroquinone which were maintained at a temperature of about 70° C. were introduced into the head of the column. The sump of the column was so heated that a weak reflux was maintained. The distillate and sump effluent were continuously withdrawn. 40 g. of distillate consisting of practically pure propanol and 554–558 g. of sump effluent were obtained per hour. Pure acrylic acid butyl ester was recovered from the latter by distillation at a pressure of 10 mm. Hg. β-propoxy propionic acid butyl ester remaining as the sump product was recycled to the extractive distillation column. The yields were almost quantitative.

*Example 5*

200 g. per hour of a mixture consisting of 18% of methacrylic acid methyl ester and 82% of methanol stabilized with 0.1% of hydroquinone were introduced into the lower portion of a column while 750 g. per hour of β-methoxy isobutyric acid methyl ester which were maintained at a temperature of about 85° C. were inrtoduced into the head of the column. The sump of the column was so heated that a weak reflux was maintained. The distillate and the sump effluent were continuously withdrawn. 160–162 g. of methanol were obtained per hour as distillate and 780–785 g. of sump effluent were obtained per hour. Pure methyl methacrylate was recovered from the latter by distillation under reduced pressure. The yields were almost quantitative.

We claim:

1. An extractive distillation process for the separation of mixtures which contain azeotropically distilling mixtures of alkanols from 1 to 4 C-atoms and unsaturated carboxylic acid esters, in which the alcohol component is a lower alkanol, which comprises introducing said mixtures in the lower part of a column, introducing a β-alkoxycarboxylic acid ester, in which the alcohol component is a lower alkanol into the upper part of the column as the extraction agent, withdrawing the alcohol on the head of the column as a distillate, withdrawing the unsaturated acid ester in admixture with the β-alkoxy carboxylic acid ester from the sump of the column and separating the sump effluent into its components by distillation under reduced pressure.

2. The process of claim 1 in which the ester-alcohol mixture to be separated is one obtained in the cleavage of a β-alkoxy carboxylic acid ester into the corresponding unsaturated carboxylic ester and alcohol.

3. The process of claim 2 in which the β-alkoxy carboxylic acid ester used as the extraction agent is the same as that from which the ester alcohol mixture is derived.

4. An extractive distillation process for the separation of the reaction product from the cleavage of a β-alkoxy carboxylic acid ester, in which the alcohol component is a lower alkanol, containing the alcohol derived from the alkoxy group of said β-alkoxycarboxylic acid ester, the remaining unsaturated carboxylic acid ester and unchanged β-alkoxy-carboxylic acid ester, which comprises continuously introducing said reaction product into the lower portion of a first distilling column while continuously introducing a quantity of the β-alkoxy carboxylic acid ester from which said ester-alcohol mixture is derived into the head of such column while distilling off the alcohol over the head of the distillation column, withdrawing the β-alkoxy carboxylic acid ester-ester mixture from the sump of such column, distilling the ester off from such mixture in a second distillation column and recycling the β-alkoxy carboxylic acid ester in part to the cleavage step and in part to the first distilling column.

References Cited by the Examiner

UNITED STATES PATENTS

| | | | |
|---|---|---|---|
| 2,406,561 | 8/1946 | Rehberg | 203—52 X |
| 2,457,225 | 12/1948 | Gresham | 260—486 |
| 2,649,475 | 8/1953 | Bellringer et al. | 260—486 |
| 2,916,512 | 12/1959 | Fisher et al. | 260—486 |
| 3,022,338 | 2/1962 | Enk et al. | 260—486 |

NORMAN YUDKOFF, *Primary Examiner.*

ALPHONSO D. SULLIVAN, W. L. BASCOMB,
*Examiners.*